(12) United States Patent
MacNeille et al.

(10) Patent No.: US 8,615,345 B2
(45) Date of Patent: Dec. 24, 2013

(54) METHOD AND APPARATUS FOR VEHICLE SYSTEM CALIBRATION

(75) Inventors: Perry Robinson MacNeille, Lathrup Village, MI (US); Steven Joseph Szwabowski, Northville, MI (US); Mark Schunder, Dearborn, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 13/097,126

(22) Filed: Apr. 29, 2011

(65) Prior Publication Data

US 2012/0277952 A1   Nov. 1, 2012

(51) Int. Cl.
*B60H 1/00* (2006.01)

(52) U.S. Cl.
USPC ............................................. 701/36; 701/49

(58) Field of Classification Search
USPC ........................................................ 701/423
See application file for complete search history.

(56) References Cited

U.S. PATENT DOCUMENTS

| | | | |
|---|---|---|---|
| 5,781,125 A | 7/1998 | Godau et al. | |
| 5,922,041 A | 7/1999 | Anderson | |
| 6,064,322 A | 5/2000 | Ohira | |
| 6,337,621 B1 | 1/2002 | Ogino et al. | |
| 6,356,839 B1 * | 3/2002 | Monde et al. | 701/415 |
| 6,434,455 B1 | 8/2002 | Snow et al. | |
| 6,553,292 B2 | 4/2003 | Kokes et al. | |
| 6,598,183 B1 | 7/2003 | Grieco et al. | |
| 6,603,394 B2 | 8/2003 | Raichle et al. | |
| 6,611,740 B2 | 8/2003 | Lowrey et al. | |
| 6,636,790 B1 | 10/2003 | Lightner et al. | |
| 6,687,587 B2 | 2/2004 | Kacel | |
| 6,738,697 B2 | 5/2004 | Breed | |
| 6,778,888 B2 | 8/2004 | Cataldo et al. | |
| 6,978,198 B2 | 12/2005 | Shi | |
| 7,146,307 B2 | 12/2006 | Mocek | |
| 7,155,321 B2 | 12/2006 | Bromley et al. | |
| 7,209,490 B2 | 4/2007 | Isaac et al. | |
| 7,228,211 B1 | 6/2007 | Lowrey et al. | |
| 7,232,962 B2 | 6/2007 | Rynd | |
| 7,277,780 B2 | 10/2007 | Meier-Arendt et al. | |
| 7,340,365 B2 | 3/2008 | Wubbena et al. | |

(Continued)

FOREIGN PATENT DOCUMENTS

| | | |
|---|---|---|
| EP | 0808492 | 8/1996 |
| JP | 9264819 A | 10/1997 |
| JP | 11326140 A | 11/1999 |
| JP | 2006018680 A | 1/2006 |

OTHER PUBLICATIONS

Ford Motor Company, "SYNC with Navigation System," Owner's Guide Supplement, SYNC System Version 1 (Jul. 2007).

(Continued)

*Primary Examiner* — Michael J Zanelli
(74) *Attorney, Agent, or Firm* — Jennifer Stec; Brooks Kushman P.C.

(57) ABSTRACT

A computer-implemented method includes requesting weather data from a remote location. The illustrative embodiment further includes determining if one or more vehicle systems should be adjusted, based at least in part on the requested weather data. The illustrative embodiment additionally includes adjusting one or more vehicle systems contingent at least in part on the determining. The illustrative embodiment further includes repeating the determining and adjusting until no weather data remains for processing.

13 Claims, 7 Drawing Sheets

(56) References Cited

U.S. PATENT DOCUMENTS

| | | | |
|---|---|---|---|
| 7,343,526 B2 | 3/2008 | Aditham | |
| 7,356,394 B2 | 4/2008 | Burgess | |
| 7,366,934 B1 | 4/2008 | Narayan et al. | |
| 7,379,541 B2 | 5/2008 | Iggulden et al. | |
| 7,487,074 B2 | 2/2009 | Ohtsu et al. | |
| 7,493,209 B1* | 2/2009 | Altrichter et al. | 701/423 |
| 7,522,995 B2 | 4/2009 | Nortrup | |
| 7,532,962 B1 | 5/2009 | Lowrey et al. | |
| 7,590,476 B2 | 9/2009 | Shumate | |
| 7,905,815 B2 | 3/2011 | Ellis et al. | |
| 7,983,839 B2 | 7/2011 | Sutardja | |
| 8,024,111 B1* | 9/2011 | Meadows et al. | 701/414 |
| 8,103,443 B2 | 1/2012 | Kantarjiev et al. | |
| 8,126,644 B2 | 2/2012 | Amano | |
| 8,140,358 B1 | 3/2012 | Ling et al. | |
| 8,185,299 B2* | 5/2012 | Fujiwara et al. | 701/423 |
| 8,219,249 B2* | 7/2012 | Harrod et al. | 700/276 |
| 8,285,439 B2 | 10/2012 | Hodges | |
| 8,315,802 B2 | 11/2012 | Brown | |
| 8,364,402 B2 | 1/2013 | Ross et al. | |
| 8,390,473 B2* | 3/2013 | Krzyzanowski et al. | 340/870.02 |
| 8,392,105 B2* | 3/2013 | Desborough | 701/301 |
| 2002/0035429 A1 | 3/2002 | Banas | |
| 2002/0173885 A1 | 11/2002 | Lowrey et al. | |
| 2003/0034769 A1 | 2/2003 | Lipscomb et al. | |
| 2003/0036832 A1 | 2/2003 | Kokes et al. | |
| 2003/0163587 A1 | 8/2003 | Knight et al. | |
| 2004/0024502 A1 | 2/2004 | Squires et al. | |
| 2004/0044454 A1 | 3/2004 | Ross et al. | |
| 2004/0054503 A1 | 3/2004 | Namaky | |
| 2004/0093134 A1 | 5/2004 | Barber et al. | |
| 2004/0128071 A1 | 7/2004 | Schradi | |
| 2004/0172177 A1 | 9/2004 | Nagai et al. | |
| 2004/0194479 A1 | 10/2004 | Umebayashi et al. | |
| 2004/0218894 A1 | 11/2004 | Harville et al. | |
| 2005/0090939 A1 | 4/2005 | Mills et al. | |
| 2005/0096020 A1 | 5/2005 | Oesterling | |
| 2005/0097541 A1 | 5/2005 | Holland | |
| 2005/0192724 A1* | 9/2005 | Hendry | 701/36 |
| 2005/0281414 A1 | 12/2005 | Simon et al. | |
| 2006/0034231 A1 | 2/2006 | Tailor | |
| 2006/0041348 A1 | 2/2006 | Liebl et al. | |
| 2006/0130033 A1 | 6/2006 | Stoffels et al. | |
| 2006/0132291 A1 | 6/2006 | Dourney, Jr. et al. | |
| 2006/0155437 A1 | 7/2006 | Wang et al. | |
| 2006/0229777 A1 | 10/2006 | Hudson et al. | |
| 2006/0253235 A1 | 11/2006 | Bi et al. | |
| 2007/0121959 A1 | 5/2007 | Philipp | |
| 2007/0162796 A1 | 7/2007 | Chan et al. | |
| 2007/0171029 A1 | 7/2007 | Inbarajan | |
| 2007/0179799 A1 | 8/2007 | Laghrari | |
| 2008/0015748 A1 | 1/2008 | Nagy | |
| 2008/0027605 A1 | 1/2008 | Oesterling | |
| 2008/0027606 A1 | 1/2008 | Helm | |
| 2008/0082226 A1* | 4/2008 | Amador et al. | 701/29 |
| 2008/0140281 A1 | 6/2008 | Morris et al. | |
| 2008/0147267 A1 | 6/2008 | Plante et al. | |
| 2008/0162033 A1 | 7/2008 | Wagner et al. | |
| 2008/0167056 A1 | 7/2008 | Gilzean et al. | |
| 2008/0167078 A1 | 7/2008 | Eibye | |
| 2008/0172357 A1 | 7/2008 | Rechis et al. | |
| 2008/0216067 A1 | 9/2008 | Villing | |
| 2008/0269975 A1 | 10/2008 | Bertosa et al. | |
| 2009/0063038 A1 | 3/2009 | Shrivathsan et al. | |
| 2009/0063045 A1* | 3/2009 | Figueroa et al. | 701/210 |
| 2009/0143937 A1* | 6/2009 | Craig | 701/37 |
| 2009/0177352 A1 | 7/2009 | Grau et al. | |
| 2009/0210145 A1 | 8/2009 | Amano | |
| 2009/0276115 A1 | 11/2009 | Chen | |
| 2009/0292416 A1 | 11/2009 | Ubik et al. | |
| 2009/0308134 A1 | 12/2009 | Pepper | |
| 2009/0326757 A1 | 12/2009 | Andreasen et al. | |
| 2009/0326991 A1 | 12/2009 | Wei et al. | |
| 2010/0042287 A1 | 2/2010 | Zhang et al. | |
| 2010/0042288 A1 | 2/2010 | Lipscomb et al. | |
| 2010/0556055 | 3/2010 | Ketari | |
| 2010/0204878 A1 | 8/2010 | Drew et al. | |
| 2010/0245123 A1 | 9/2010 | Prasad et al. | |
| 2010/0246846 A1 | 9/2010 | Burge et al. | |
| 2010/0256861 A1 | 10/2010 | Hodges | |
| 2010/0262335 A1 | 10/2010 | Brozovich | |
| 2011/0022422 A1 | 1/2011 | Taylor | |
| 2011/0041088 A1 | 2/2011 | Mason et al. | |
| 2011/0046883 A1 | 2/2011 | Ross et al. | |
| 2011/0190962 A1* | 8/2011 | Peterson et al. | 701/2 |
| 2011/0225096 A1 | 9/2011 | Cho et al. | |
| 2011/0258044 A1 | 10/2011 | Kargupta | |
| 2011/0276218 A1 | 11/2011 | Dwan et al. | |
| 2011/0276219 A1 | 11/2011 | Swaminathan et al. | |
| 2012/0029762 A1 | 2/2012 | Ubik et al. | |
| 2012/0030512 A1 | 2/2012 | Wadhwa et al. | |
| 2012/0053782 A1 | 3/2012 | Gwozdek et al. | |
| 2012/0072055 A1 | 3/2012 | Barlsen et al. | |
| 2012/0075092 A1 | 3/2012 | Petite et al. | |
| 2012/0294238 A1 | 11/2012 | Uhler | |

OTHER PUBLICATIONS

Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
DrewTech gets you on the Bus, article printed from www.drewtech.com, Dec. 16, 2009.
The CarDAQ-Plus Advantage, Drew Technologies, Inc.
Software, Pass Thru Pro II, J2534 Flash Reprogramming, printed from buy1.snapon.com, Dec. 3, 2009.
Integrated Diagnostic System (IDS), Ford, Lincoln, Mercury.
Pegisys PC Diagnostic System, PC-based J2534 Reprogramming & Scan Tool, printed from www.otctools.com.
Introduction to J2534 and Flash Reprogramming, Drew Technologies, Copyright 2009.
CarDAQ-Plus, Drew Technologies, Inc.
Dynetics Vehicle Data Recorder Models DVG-II and WDVG-II (2009) printout from www.dynetics-ia.com.

* cited by examiner

METHOD AND APPARATUS FOR VEHICLE SYSTEM CALIBRATION

TECHNICAL FIELD

The illustrative embodiments generally relate to a method and apparatus for vehicle system calibration.

BACKGROUND

Although many drivers are unaware of the fact, weather can have a profound effect on vehicle system performance. The presence of heat, humidity, wind, salinity and other atmospheric conditions can negatively or positively affect numerous vehicle systems.

For example, in hybrid vehicles or battery electric vehicles, the presence of excess heat or cold can greatly impact battery efficiency and performance. In fuel-propelled vehicles, combustion in the engine can be affected by humidity. In vehicles equipped with solar regeneration capacity, cloud cover can diminish this capacity. Wind can produce resistance to driving, diminishing fuel efficiency of almost any type of vehicle. Extreme temperatures can also encourage a greater usage of vehicle HVAC systems, draining batteries and/or fuel in an attempt to maintain a comfortable cabin temperature within the vehicle.

Weather forecasts have a tendency to be moderately accurate at best, and rarely can they accurately predict specific conditions at a particular location and future time. If the driver of a vehicle is located in the immediate proximity of a weather station, then the accuracy of the report may be almost spot on, but the further a driver moves from the point where the conditions were actually measured, the less precise the predictions or measurements are apt to be, and they are more likely to be a generalization of observed weather at locations where measurements are taken.

Because weather data is often imprecise and/or varies with travel, it is difficult to appropriately modify changeable vehicle systems to adapt to localized weather. Further, it is difficult to predictively adapt to weather, since any advance calibration may simply be done off of a nominal measurement or prediction of weather. In at least one example, a persistence forecast may be used for adjustment, but this may be highly inaccurate.

SUMMARY

In a first illustrative embodiment, a computer-implemented method, executable by a vehicle computing system (VCS), includes requesting weather data from a remote location. The illustrative embodiment further includes determining if one or more vehicle systems should be adjusted, based at least in part on the requested weather data. The illustrative embodiment additionally includes adjusting one or more vehicle systems contingent at least in part on the determining. The illustrative embodiment further includes repeating the determining and adjusting until no weather data remains for processing.

In another illustrative example, a computer-implemented method, executable by a vehicle computing system (VCS), includes determining if a vehicle system adjustment is appropriate based at least on received weather data. The method also includes determining whether secondary considerations should be analyzed prior to adjusting the vehicle system. The illustrative method additionally includes analyzing at least one secondary consideration, contingent on whether secondary considerations should be analyzed. Also, the method includes automatically adjusting the vehicle system, according to a predetermined adjustment instruction, based at least in part on the weather data and one or more secondary considerations.

In yet a third illustrative embodiment, a computer-implemented method includes determining a route-of-travel for a vehicle and accessing weather data over the route-of-travel. The method additionally includes analyzing the effect of the weather shown by the weather data on one or more vehicle systems. The method further includes determining an optimal route based at least in part on the analyzing and adjusting the route-of-travel to conform to the optimal route. The method also includes providing the driver with the adjusted route-of-travel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
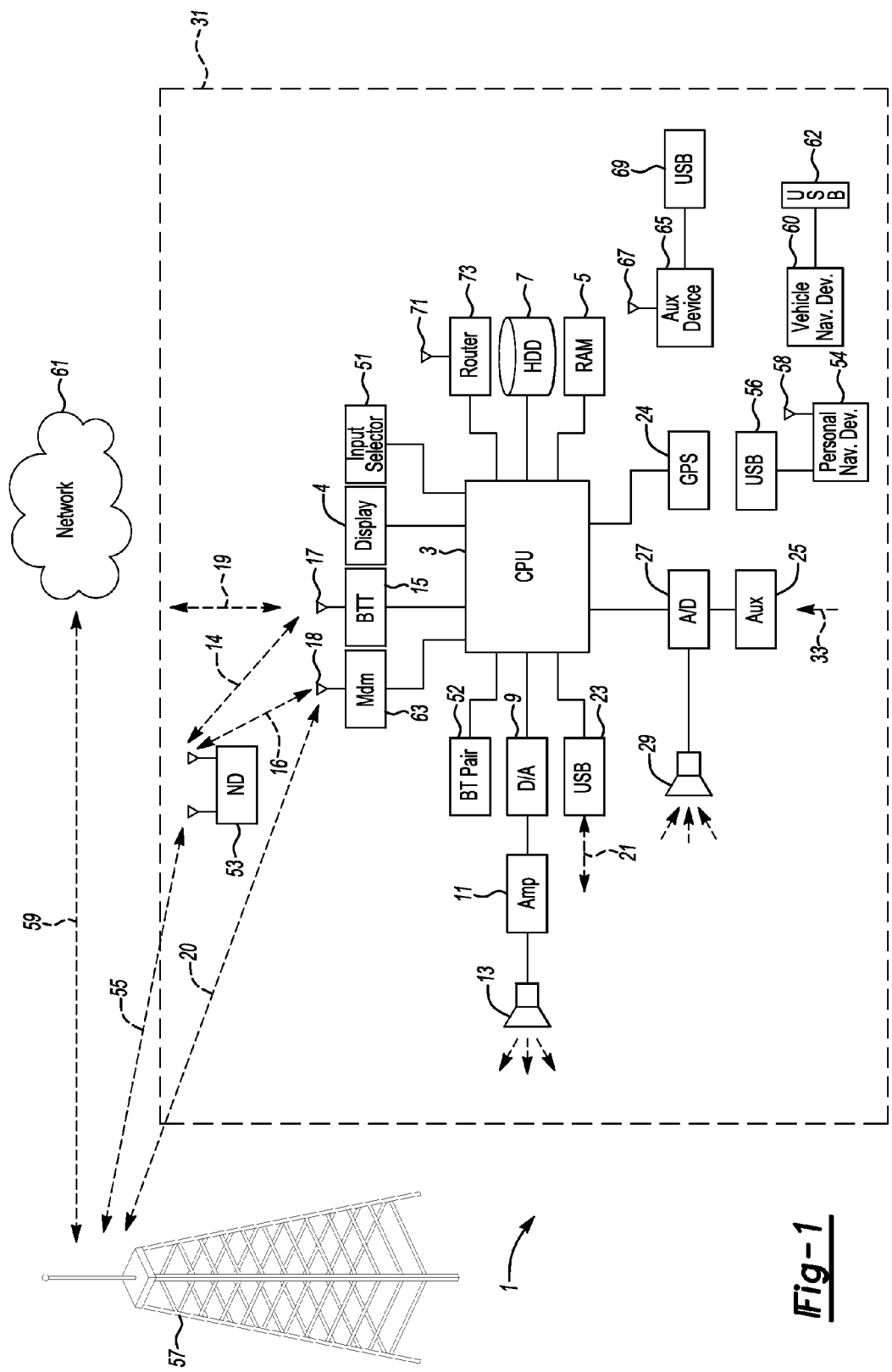
FIG. 1 shows an illustrative example of a vehicle associated computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users.

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a cellular phone or other wireless device or a remote server connected through a wireless device. Collectively, such systems may be referred to as vehicle associated computing systems (VACS), although in certain embodiments only some of the VACS may perform a particular process, depending on the steps of the process and the appropriateness of a particular system for performing those steps. E.g., without limitation, if a process has a step of sending or receiving information with a paired wireless device, then it is likely that the wireless device is not performing the process, since the wireless device would not "send and receive" information with itself. If two devices are present, however, then one wireless device may be used. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

It may be possible to use a technique known as "crowd sourcing" to gather localized weather data with a far more efficient level of accuracy than is currently had with respect to the data. Much of our current weather data comes from a combination of satellite data mixed with observed conditions at fixed locations known as weather stations. Because weather stations are not present in abundance (e.g., on every street corner), much of the localized data gathered by the stations must be used to extrapolate predicted conditions at locations between the stations.

On the other hand, unlike weather stations, vehicles do tend to be present on virtually every street corner. If vehicles are equipped with certain weather sensing capability, they can provide a much more accurate snapshot of current weather conditions. This data can be used to adjust or calibrate other vehicles in the same proximity as measured data, and can further be pooled to provide a large database of weather data from which accurate projections of upcoming weather along a certain route can be obtained. At least one technique for such a process is described in detail with respect to U.S. patent application Ser. No. 13/030,504, filed on Feb. 18, 2011, the contents of which are hereby incorporated by reference.

By using the collective gathering power of literally up to millions of vehicles, which are constantly able to gather weather data as they travel dynamically throughout their course of operations, hundreds of millions or even billions of points of weather data can be gathered throughout a day. This makes it possible to much more accurately "know" the actual weather characteristics of a particular location, even if the vehicle presently at the location is incapable of immediately taking all the desired measurements.

This data can then be used to both dynamically adjust vehicle systems to optimize performance given the known data, and to predictively adjust systems (or routes) based on where a vehicle may be headed and the observed weather along a route.

Figure 2:
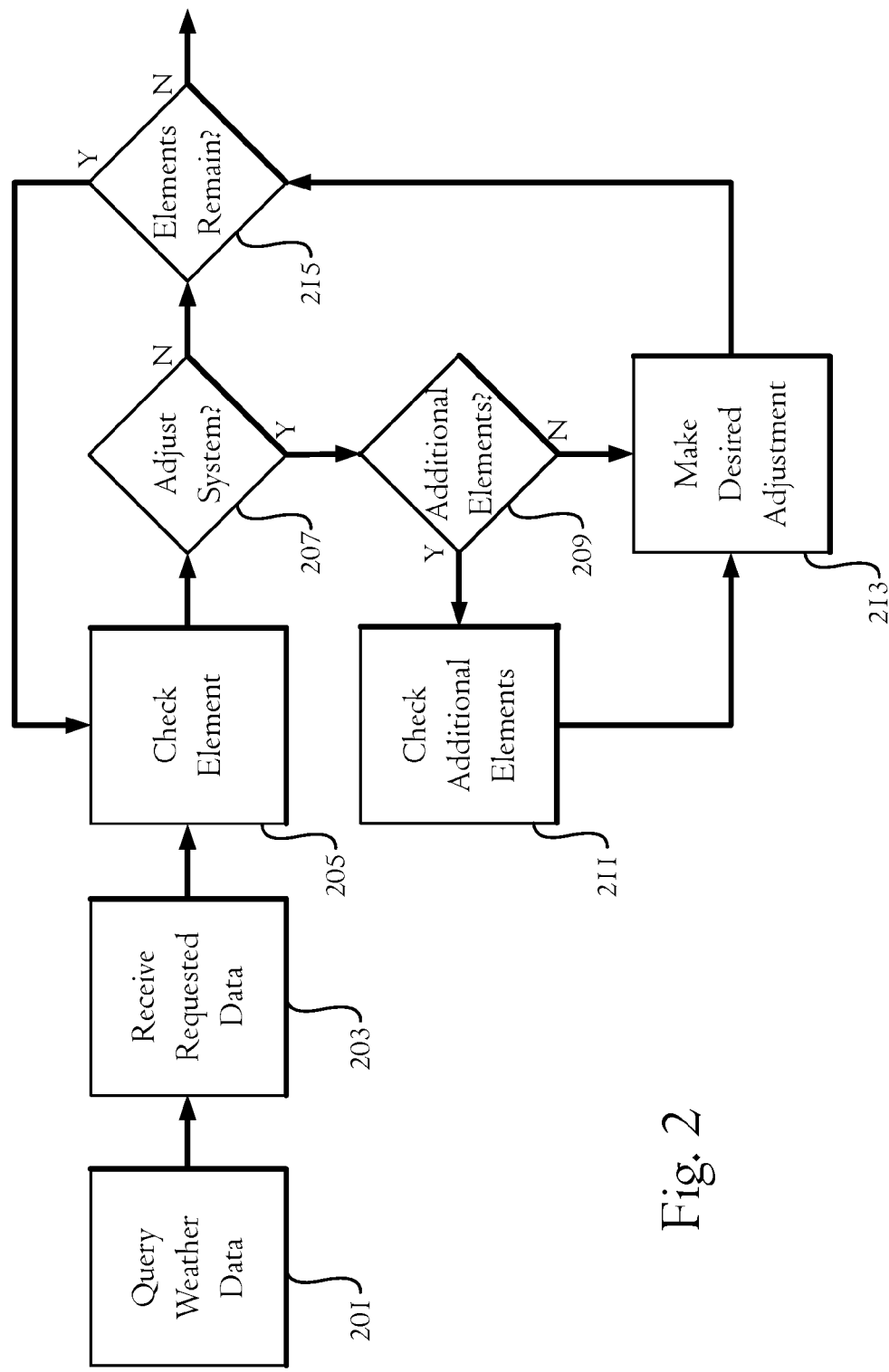
FIG. 2 shows an illustrative process for dynamically adjusting one or more vehicle systems based at least in part on observed weather data.

FIG. 2 shows an illustrative process for dynamically adjusting one or more vehicle systems based at least in part on observed weather data. In this illustrative embodiment, the process will use observed weather data to adaptively alter one or more vehicle components or systems, in order to optimize performance based on known or accurately predicted data. Weather data includes both current weather data and forecast data for a future point in time.

In this illustrative example, the process first queries a "warehouse" of weather data 201. This could be, for example, without limitation, a remote database, a local database, etc.

In one illustrative example, this "warehouse" is a remote database consisting of all points of data observed by vehicles recently traveling in a location for which data is desired. In this manner, data that is up to date and location-specific can be obtained. Data can be ensured some degree of accuracy through normalization and through discardation of incongruous data (such as may be observed by a vehicle in an artificial climate, such as a garage).

The requested data is received (or, alternatively, may be processed remotely if desired) 203 and a particular element of the data is checked by the process 205. For example, without limitation, if the process wanted to know what the local humidity, wind speed and temperature will be, it could first check the humidity.

If there is an adjustment to be made based on the observed data 207, then the system will see if the adjustment should also be made based on additional elements.

In one non-limiting example, it may be observed that the interior temperature of the car is 72 degrees, and the exterior temperature is 68 degrees. In such a case, the vehicle may suggest to the driver that, instead of running air conditioning, it may be desirable to roll down a window and the approximate desired temperature may then be maintained. But, perhaps before making such a suggestion, the vehicle may wish to check for exterior precipitation (either locally present or upcoming) and may also wish to check local windspeed (a driver may not want to open a window when twenty m.p.h cross-winds are present). Accordingly, before adjusting certain systems in response to detected data, it may also be determined if additional elements are needed to be examined prior to action 209.

If no additional elements are needed, the system makes an adjustment (or suggestion, etc.) 213 based on the observed data. If additional elements are needed, those elements are also checked in the received data 211, and then the according adjustment, suggestion, etc. may be made.

If no adjustment is needed at step 207, or if an adjustment has been made at step 213, the system then checks to see if any additional elements remain for processing 215. If so, the process is repeated until all desired weather data has been examined. By periodically or constantly examining the exterior atmospheric and weather conditions in this manner, vehicle component control may be optimized to some extent, resulting in, for example, without limitation, better fuel efficiency, longer component life, and more pleasant driver experience.

Figure 3:
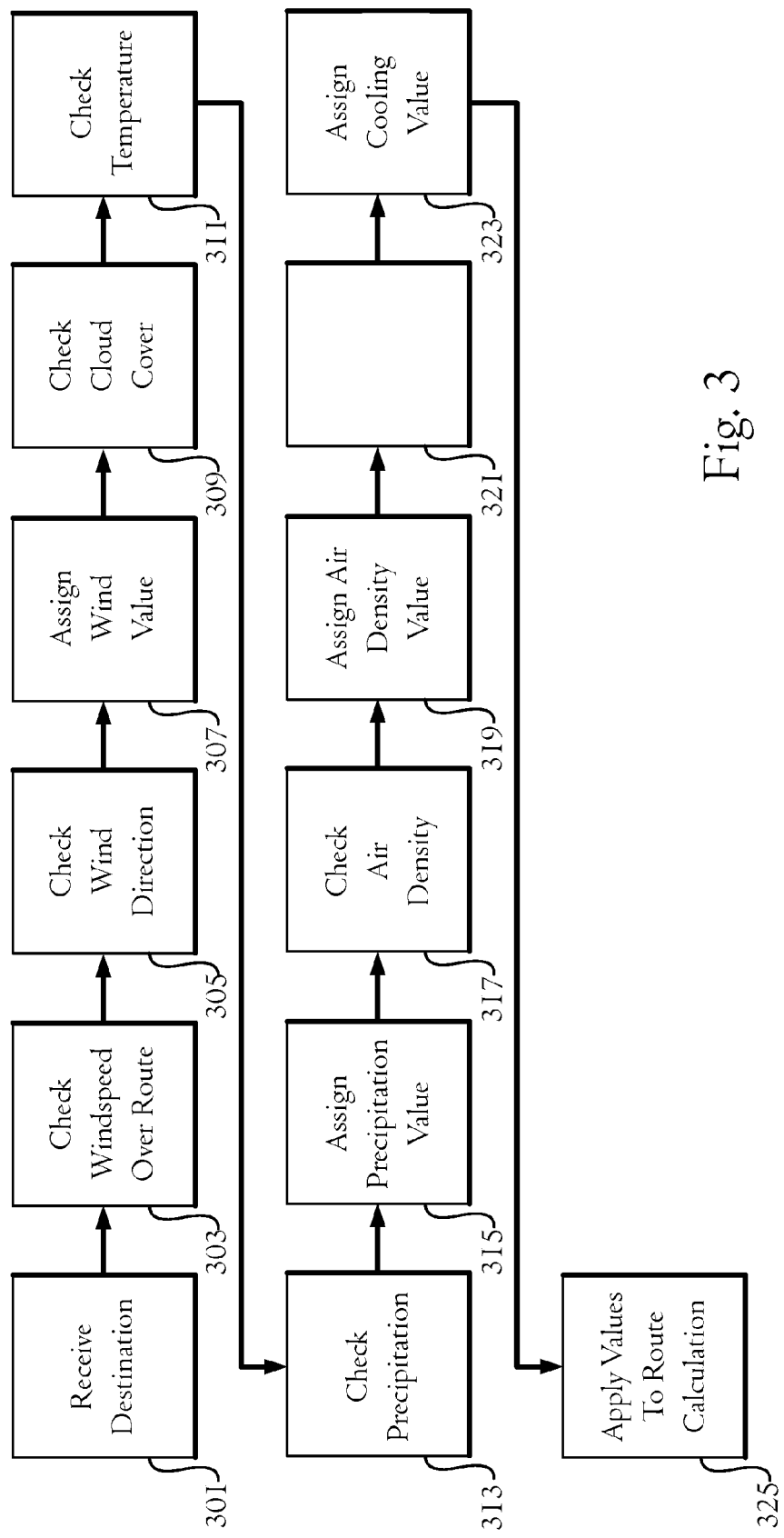
FIG. 3 shows an illustrative process for route determination based on a plurality of exemplary weather conditions.

FIG. 3 shows an illustrative process for route determination based on a plurality of exemplary weather conditions. In this illustrative embodiment, a routing system may determine that a particular route, while the most expedient from a pure distance/speed perspective, may not be the optimal route based on, for example, a likelihood of weather related delays or a poor fuel efficiency due to weather.

By combining known driver tendencies and/or known principals of weather effect on vehicles, the impact of weather conditions on fuel efficiency can generally be determined when weather is known over a given route.

For example, a certain driver may like to run A/C when the temperature is over a certain level. This can negatively effect fuel efficiency although may not result in general delays otherwise (unless fuel or electric power is low in the vehicle). In another example, the presence of precipitation may effect rolling resistance and wheel slippage, and effect energy usage along a route.

In still a further example, the thermal efficiency of a combustion engine depends on the density of the air, which is a function of barometric pressure, temperature and humidity. The presence of aerosols such as fog may also impact engine efficiency.

Along short routes, the temperature of the vehicle at the start of the route can have a large impact on energy consumption. If a driver waits until a vehicle's standing temperature is likely optimized (based on predicted weather), less energy can be used for, for example, a quick trip to the store.

Opening windows and/or sunroofs can create increased drag, especially in the presence of high winds. Given the orientation of the vehicle and the current wind-speed, it may be more energy efficient to use an HVAC system than to have the vehicle windows opened.

Weather forecasts can also be used to pre-condition a vehicle. For example, batteries are inefficient at temperatures outside a known range. When a vehicle is connected to a charger, power from the charger may be used to heat or cool a battery so that an optimal temperature range is maintained. Smart chargers may also attempt to adapt the charging of the current in real-time to factors such as the current cost and GHG production of the electricity being used. This process may be done more efficiently if ambient air temperature is known (and upcoming changes in ambient air temperature are also known, based on predictions from observed weather data changes and weather movement).

It may also be possible to adaptively activate heaters in the anticipation of an onset of sub-freezing weather, in order to prevent a water-vapor environment operating fuel cell from being damaged by extreme cold. Turning on the cell or activating a heater in anticipation of cold weather may prevent damage to the cell.

Additionally, certain routes may be desirable for their scenic value, but these routes are likely to be less scenically appealing (and possibly even treacherous) under certain weather conditions. If a given route takes a "scenic" path, a system that anticipates weather can adaptively warn a driver if the route is likely to be treacherous or less scenically appealing.

Weather patterns can also be used to predict a likelihood of atmospheric pollutant presence, such as pollen, dust, salt, corrosives, ozone, hydrocarbons, etc. Drivers may choose to avoid areas with high likelihood of present contaminants, in the interest of preserving their own health and the health of the vehicle.

In the example shown in FIG. 3, several non-limiting weather conditions are considered when preparing or recommending a route. In this illustrative example, at least one general route between a location and a destination is examined, to get a sense of weather conditions over the route. The data can then be factored in to a route calculation.

First, in this example, a destination is input into a vehicle associated computing system. The system performing the weather data calculation can include, but is not limited to, a vehicle computing system, a remote computing system, a cellular phone in communication with a vehicle computing system, etc.

Next, in this example, wind speed over the route is checked 303. This data can be used to determine wind resistance, reasonableness of an open-window recommendation, impact on travel time and fuel efficiency, etc. In this example, the wind direction is also checked 305, so that the system can determine if the wind will be helping or hindering the travel. Based on the observed values, a value is assigned to a wind component of a calculation 307. For example, the impact a head-wind has on efficiency varies as a cube of the observed speed, so a rise in a detected or predicted headwind could have an exponential impact on a "wind value" portion of an efficiency equation. If an observed wind value is at or around zero, then a very low value may be assigned to the "wind value" portion of the equation. A high tail-wind may have the opposite effect as a high head-wind, and may positively affect the desirability of a route. Observed speed can also be used to determine apparent wind velocity, that is, the perceived velocity with relation to the vehicle.

Also, in this illustrative example, cloud cover 309 and temperature 311 are checked. This data can be used to determine likely operating temperatures, likelihood of HVAC usage, need for heating or cooling components (using extra power), availability of sun for regenerative solar systems, etc. Based on both a vehicle type (since the presence of heat/cold/sun will impact efficiency of different vehicles differently) and the prevalence of clouds/sun/heat/cold, a sunniness and/or temperature value may be assigned 313.

This illustrative process also examines precipitation or likely precipitation along a route 315, to determine the impact that this may have on driving. A correspondent value is again assigned 317.

If precipitation is not present or very light and scattered, the value assigned to precipitation may be very low, since it will have no or minimal impact on a route. If the precipitation likelihood is high, and/or if there is a significant amount of precipitation, the impact could be significant, both in impact on efficiency and in impact on travel time.

It is possible that two values are assigned to each weather condition, one corresponding to travel time and one corresponding to efficiency. For example, with respect to a high-speed headwind—a driver can probably drive through the headwind at almost the same speed as if there were no headwind, so the impact on travel time might be minimal. At the same time, maintaining a high speed in the presence of a powerful headwind may greatly diminish fuel efficiency, and a fuel-conscious driver may be advised to slow down or find another route.

In this example, air density 319 is also checked and a value is assigned to air density as well 321 (which may be observed as a combination of other known factors). Energy required to cool the battery of a battery powered or hybrid vehicle may also be determined based on one or more of these factors and a "battery cooling" value may be determined for fuel efficiency calculations 323.

Once all desired data has been examined and the corresponding values have been assigned, the values can be applied to the route calculation (this could also be done as the route is calculated) and a resulting efficiency and/or delay value can be obtained. This can help a driver choose a more efficient route or a geographically longer route that may result in faster or more efficient travel.

Figure 4:
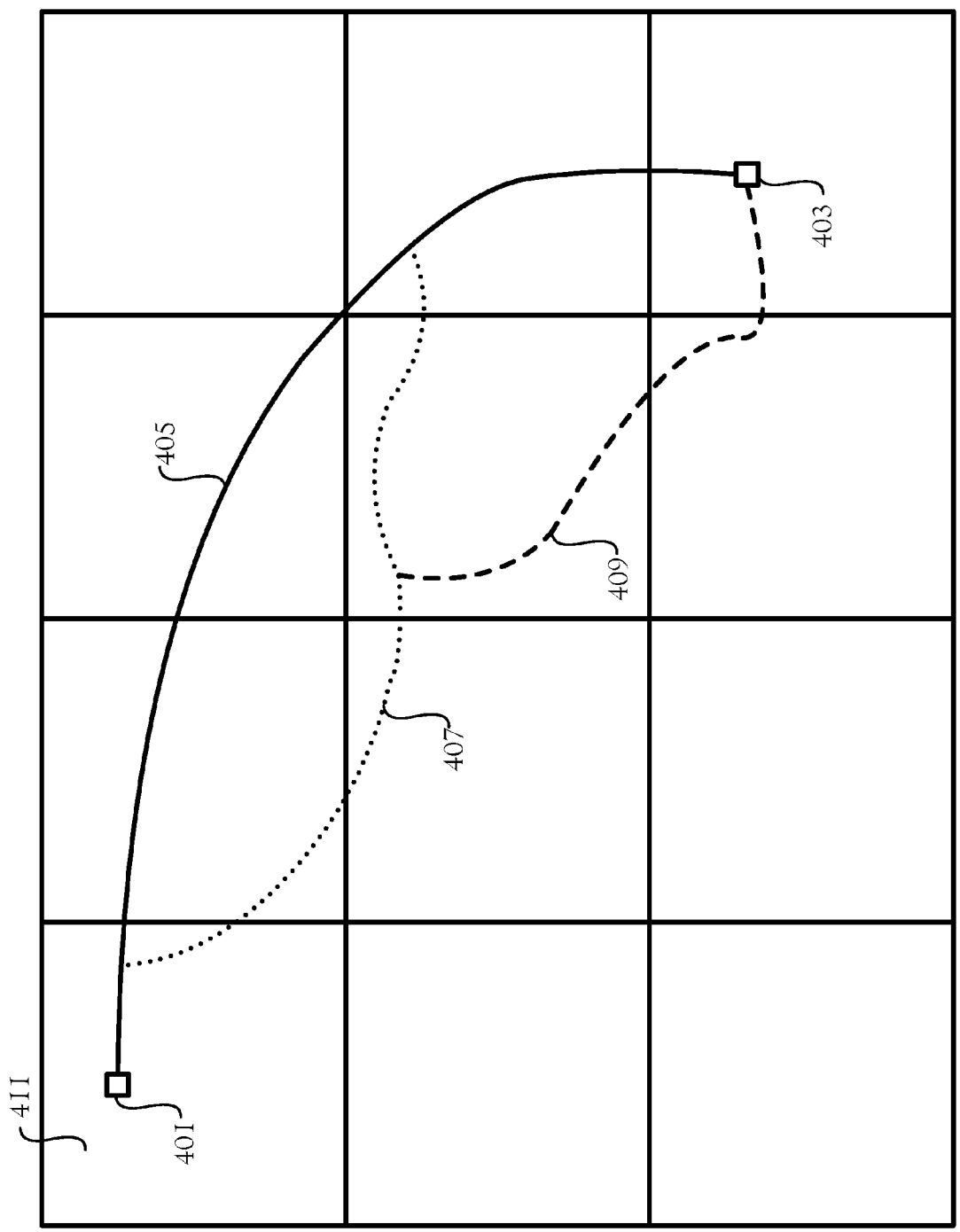
FIG. 4 shows a plurality of possible routes to a destination, each route having a different "value" based at least in part on observed weather conditions.

FIG. 4 shows a plurality of possible routes to a destination, each route having a different "value" based at least in part on observed weather conditions. In this illustrative example, the route has been broken into a "grid" for faster processing. Since there could literally be millions of possible routes between a current location and a destination, it may not be efficient to perform a precise weather data calculation for every single route. Since it is not unreasonable to assume that the weather one street over is the same (or very, very close to) the weather on a current street, in most cases it is unlikely that an efficient move can be made by simply moving one street over. This is but one exemplary example of a suitable implementation. Other methods of implementation are also within the scope of the invention.

By breaking a map into manageable grids, routes can be calculated that pass through a plurality of grid squares, and each grid square can have one or more values associated therewith corresponding to efficiency/speed of travel based on weather. If the "optimal" non-weather based route is chosen through a square, that route may be assumed to correspond to the desired route assuming travel through that square is desired at all.

In this manner, devices lacking the capacity to apply weather data to every route in an efficient manner can still examine several desirable routes to find the most optimal of the bunch. Although this may not technically be the "best" route, it should be relatively close in correspondence to the most efficient route (i.e. "acceptably sub-optimal").

In this example, the map has been broken into a plurality of grid elements 411. A starting location 401 and an ending location 403 are both known before route calculation is performed.

Several routes of similar desirability, before weather is factored in, are determined as the "best" routes from 401 to 403 if weather was a non-factor. These routes are somewhat similar in distance, travel speed, and they pass through different quadrants (so that the weather affecting one may not affect a different route). Once the routes 405, 407 and 409 have been determined, weather and atmospheric conditions affecting the portions of the routes in each of the quadrants through which a given route passes can be applied to a calculation.

In this example, although there are twelve quadrants, weather data is only needed for eight of the quadrants. Based on factors such as, but not limited to, the distance traveled in a quadrant, the orientation of the vehicle over that distance, the elevation of the vehicle, and the projected speed of the vehicle in each quadrant, efficiency data can be examined for each route and applied to the calculation. From this an optimal route meeting driver designated constraints may be obtained.

It is even possible for a driver to be willing to sacrifice only a certain amount of efficiency for a time delay, and for the calculation to take this into account. For example, a driver may desire a route that either: a) reaches a destination within a half hour; or b) provides efficiency of at least 25 m.p.g.

The driver preferences may further indicate that delays of 10% or greater are only desired in the instance where efficiency of 30 m.p.g. can be obtained. Thus, the routing engine may have a first route that allows a travel time of 28 minutes, but gets 23 m.p.g., and a second route with a travel time of 35 minutes, at an efficiency of 29 m.p.g. In this instance, the former route would be recommended (or the driver could choose). The routing engine could also calculate total energy usage (it may not make sense to travel 30 miles to a destination, at an efficiency of 30 MPGe and a projected travel time of 40 minutes, if it is possible to travel 25 miles to a destination, at an efficiency of 25 MPGe, and a projected travel time of 25 minutes, unless the driver's primary concern is maxing fuel efficiency numbers for some reason).

Figure 5:
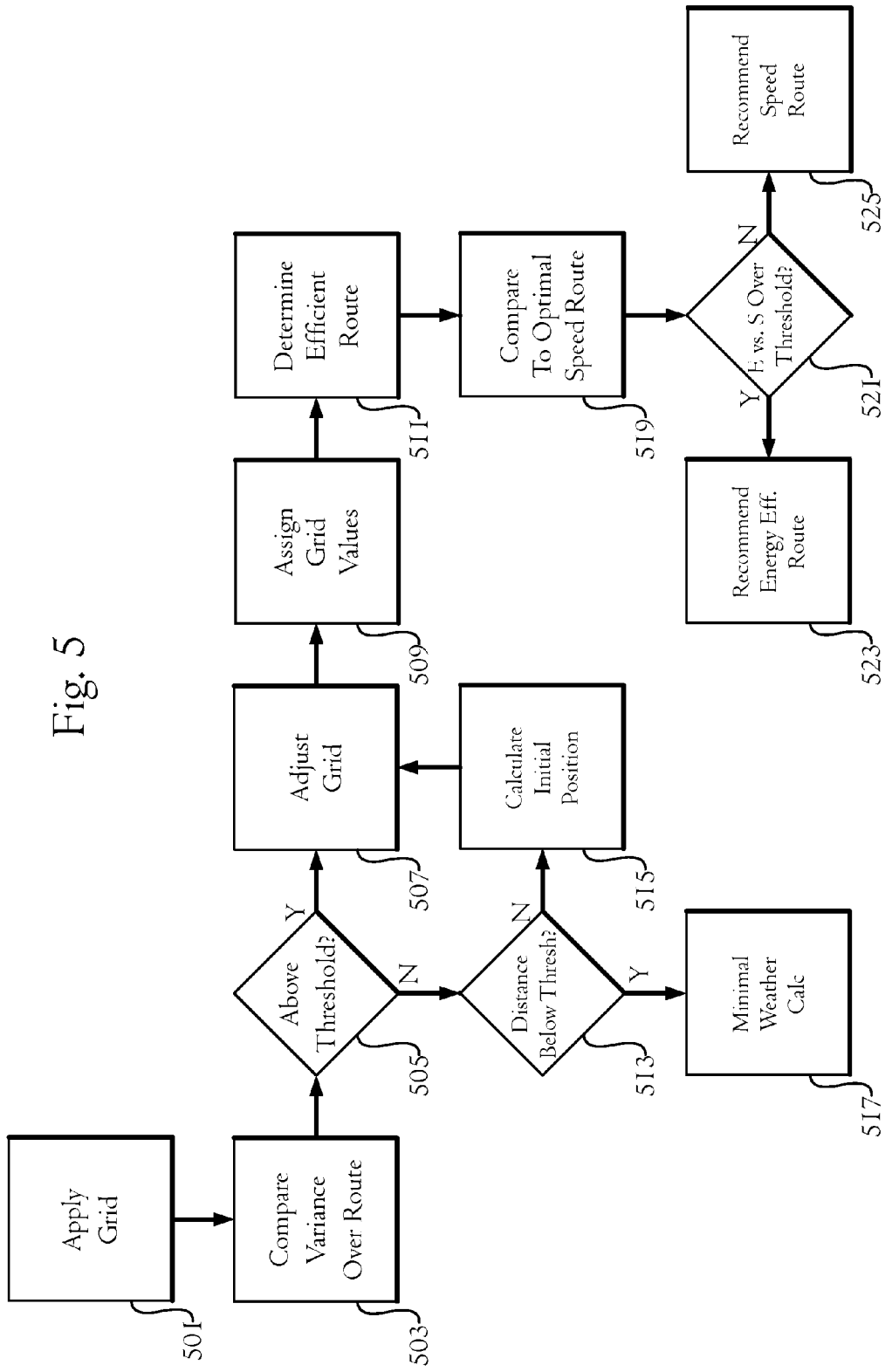
FIG. 5 shows an exemplary process for route determination based at least in part on observed weather conditions.

FIG. 5 shows an exemplary process for route determination based at least in part on observed weather conditions. This illustrative example is generally based on the grid example shown with respect to FIG. 4, or at least a similar environment. This illustrative example is also capable of dynamically adjusting quadrant sizing dependent on current weather conditions and a distance to be traveled. This example is further capable of comparing routes based on a driver input speed vs. efficiency consideration threshold.

In this illustrative example, a general grid is applied to a route-to-be-traveled 501. The grid may be predetermined by an OEM, a vehicle setting, or may be at least partially based on a distance to be traveled (e.g., a smaller grid may be used for more localized travel).

In this embodiment, the process compares a variance over a route as well 503. This variance corresponds to observed changes in weather between a start and end point of a route, and may be adjusted based on weather predictions if a route is over a certain distance in length or is likely to take a certain amount of time to travel (i.e., if the weather is likely to change over the route in an impactful manner during travel).

In one example, a straight line determination is made from the present location to the destination and weather is observed in all grid squares along that line (and possibly surrounding quadrants). If the weather is more-or-less the same (or within a certain tolerance) over all these squares, the likelihood of one route being preferable to another in terms of weather may be very low. In other words, all routes are likely to suffer from the same weather. Certain conditions, such as high speed directional winds, may make a certain route preferable, and can be accounted for, but if, for example, it is lightly raining with little wind at 67 degrees almost everywhere between a start and end point, there's likely little reason to adaptively route a vehicle based on weather, and the "quickest" route may be assumed to correspond or closely correspond to the optimal route.

If the variance shows a weather effect above a certain threshold 505, the system then checks to see if a total distance traveled is below a certain threshold 513. In this step, the system essentially determines that distance of less than a certain amount will not likely greatly benefit from an advanced weather analysis and so a "quickest" route may be chosen. Either of these "threshold" determination steps may be omitted and weather applied to all route calculations if desired.

If the weather effect is low and the distance to be traveled is short, the system may apply a minimal weather calculation 517 in the interest of providing a quick route determination unlikely to be impacted by weather.

If the distance to be traveled is above the threshold, even if the weather effect is likely to be low, an initial portion of a route is determined to get a driver moving 515, and then the grid is adjusted. Since the weather effect has been determined to be low, in this example, the initial portion of the route can be quickly determined as the "fastest" portion, and then later determinations can be made to improve the efficiency of the remaining portions of the route.

If the weather effect is determined to be high, or once the initial portion of the route is determined in a low-effect long-distance scenario, the grid may be adjusted based on, for example, without limitation, a route distance, a number-of-options, a variance in weather over the course of the route, etc.

Once the grid is adjusted, values corresponding to impactful weather data may be assigned to each grid square 509 and used to determine the most efficient route 511 based at least in part on which squares alternative routes pass through.

In this embodiment, the most efficient route is then compared to the optimal speed route (i.e., the "fastest" route) and it is determined if a loss in speed compared to a conservation of energy is above a designated threshold 521.

This threshold may be driver determined, regulation mandated, OEM set, user customizable, etc. If the threshold is exceeded, i.e., if the loss of speed is "worth it" then the energy efficient route is recommended 523. Otherwise, the "fastest" route is recommended to the driver 525. In another embodiment, a route based on known driver preferences may be recommended.

This is just one non-limiting example of the application of weather data to a vehicle system, in order to achieve optimal vehicle performance. Observed and evaluated weather data can also be used along the course of travel to make recommendations and adjustments to vehicle systems in order to maintain an predicted energy efficiency for the route, and can further be dynamically observed such that a route recommendation may change with a shift in the weather.

Figure 6:
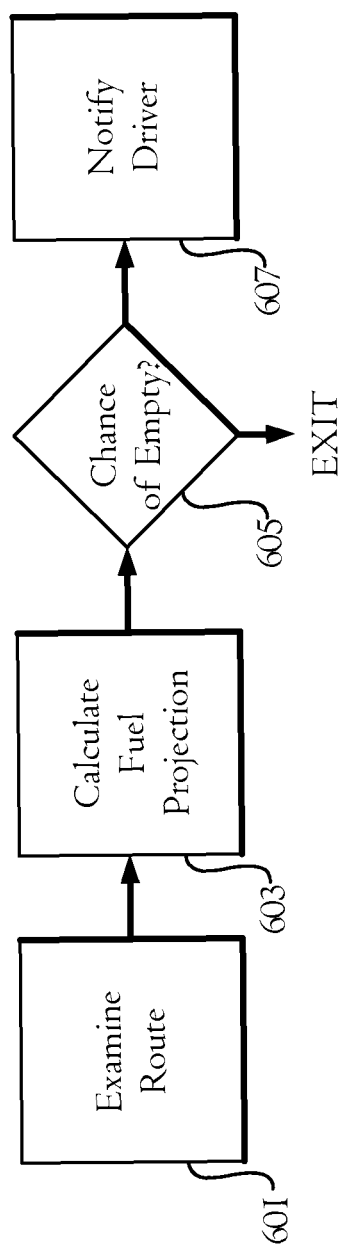
FIG. 6 shows an exemplary fuel-empty determination process.

FIG. 6 shows an exemplary fuel-empty determination process. In this illustrative embodiment, a route-calculation engine further determines if a vehicle is likely to run out of fuel along a route. Once a route has been determined for a vehicle, the route is examined 601. Fuel usage projection is calculated for the route, using, in this example, weather data to determine a more accurate projection of fuel usage, and the possibility of utilization of regenerative systems.

Based on known or predicted weather patterns and their impact on the fuel efficiency and usage of the vehicle, it is determined whether or not the vehicle has a chance of running out of fuel along a route 605.

If there is little or no chance of an empty-condition, the process exits. If there is a chance that fuel will run out, either any chance or a likelihood above a threshold, a driver may be notified 607. If a more fuel efficient route is available, that may take longer but is less likely or not likely to result in a fuel-empty condition, the driver may also be provided with a notification that such a route exists (not shown). If the driver is in a hurry, it may actually be more efficient to take the slightly longer route, since no time will be needed to stop to add fuel to a vehicle. This may be especially useful in the case of battery powered vehicles, where adding power to the vehicle can take ten minutes or more, even for a small amount of charging.

Figure 7:
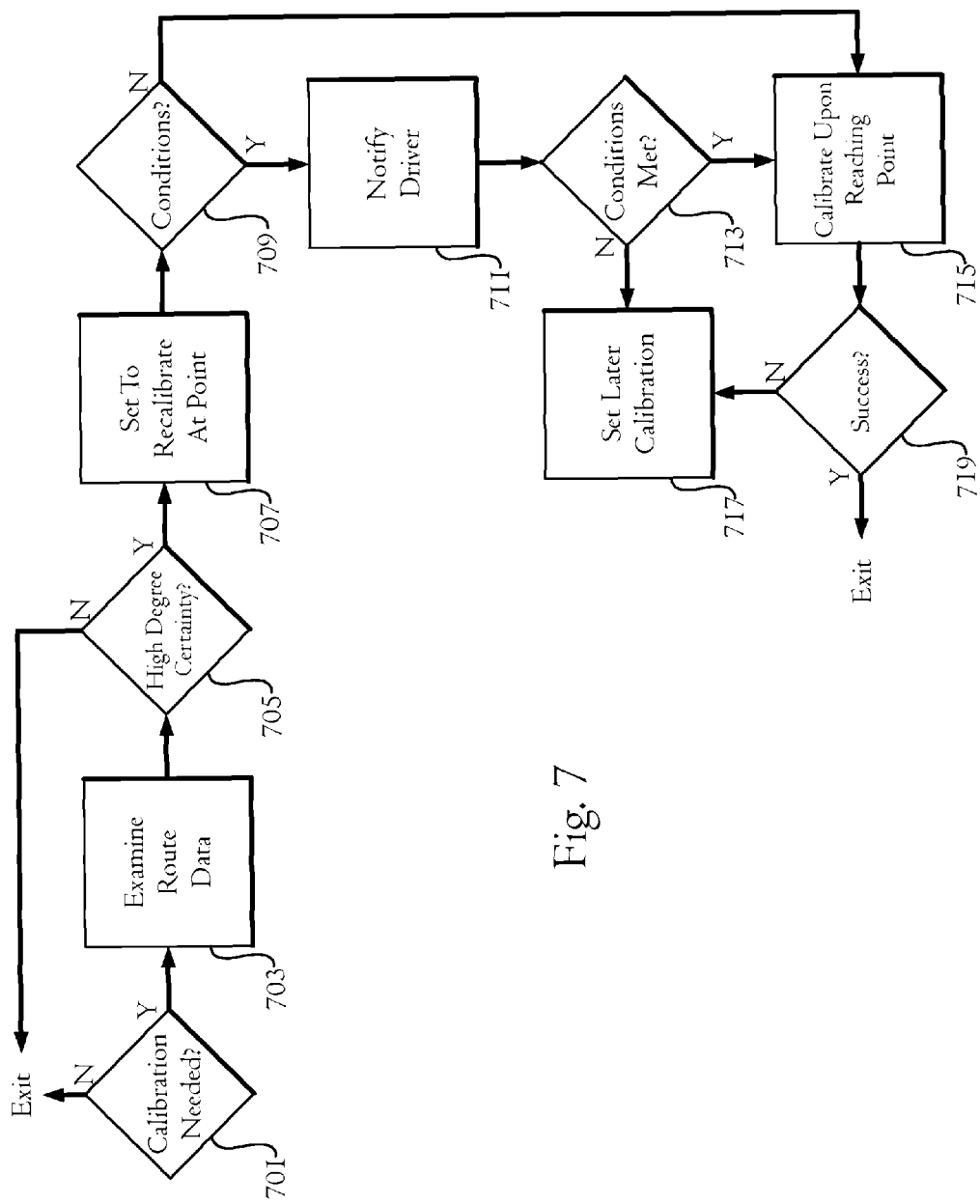
FIG. 7 shows an exemplary process for calibrating a vehicle system.

FIG. 7 shows an exemplary process for calibrating a vehicle system. Certain vehicle system, such as, but not limited to, an ammonia sensor on a vehicle emission SCR system may have sensitivity drift over the life of a vehicle. When calibrating these systems, it may be required or desirable to know one or more weather conditions to a high degree of accuracy. In this example, if calibration of a system is known to be needed 701, the process may examine an upcoming route 703 to see if there is a point along the route where a high confidence of data value is known 705.

In one example, this point could correspond to a stationary weather station. In another example, it may simply be a point through which several hundred, thousand, etc. vehicles capable of measuring the value have recently passed and where the vehicles have all reported a value within a certain tolerance of each other (i.e., indicating a high likelihood that this reported value is the accurate value).

The process can then set the system to calibrate when the point is reached 707. If the driver needs to stop the vehicle for calibration 709, the driver may be notified 711. In the event that the conditions for calibration (stopping, etc.) are not met 713, the process may set the system for calibration at a later point 717.

Otherwise, if the conditions are met 713 and the point is reached the system may be calibrated 715. If the system is successfully calibrated 719, the need to calibrate the system later may be avoided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method, executable by a vehicle computing system (VCS), comprising:
   determining if an HVAC adjustment is appropriate based at least on received weather data;
   determining whether exterior temperature should be analyzed prior to adjusting the HVAC;
   contingent on whether exterior temperature should be analyzed, analyzing exterior temperature; and
   automatically adjusting the HVAC, according to a predetermined adjustment instruction, based at least in part on the weather data and exterior temperature.

2. The method of claim 1, wherein the determining and analyzing includes determinations and analysis related to a precipitation state.

3. The method of claim 2, further comprising advising a window-down state conditional on a precipitation state being zero precipitation.

4. The method of claim 3, wherein the determining and analyzing includes determinations and analysis related to a wind-speed state.

5. The method of claim 4, further comprising advising a window-down state conditional on a wind speed state being below a threshold speed.

6. The method of claim 1, wherein the determining and analyzing includes determinations and analysis related to a wind speed state and a precipitation state.

7. The method of claim 6, wherein, if the wind-speed state is above a certain threshold or if the precipitation state is non-zero, the VCS automatically adjusts the HVAC system to maintain a desired temperature.

8. A vehicle computing system (VCS) comprising:
   a processor configured to:
   determine if an HVAC adjustment is appropriate based at least on received weather data;
   determine whether exterior temperature should be analyzed prior to adjusting the HVAC;
   contingent on whether exterior temperature should be analyzed, analyze exterior temperature; and
   automatically adjust the HVAC, according to a predetermined adjustment instruction, based at least in part on the weather data and exterior temperature.

9. The system of claim 8, wherein the processor is further configured to perform the determinations and analysis related to a precipitation state.

10. The system of claim 8, wherein the processor is further configured to advise a window-down state conditional on a precipitation state being zero precipitation.

11. The system of claim 10, wherein the processor is further configured to perform the determinations and analysis related to a wind-speed state.

12. The system of claim 11, wherein the processor is further configured to advise a window-down state conditional on a wind speed state being below a threshold speed.

13. The system of claim 8, wherein the processor is further configured to perform the determinations and analysis related to a wind speed state and a precipitation state.

* * * * *